Patented Feb. 2, 1932

1,843,308

UNITED STATES PATENT OFFICE

KLAUS WEINAND, OF COLOGNE-FLITTARD, GERMANY, ASSIGNOR TO GENERAL ANILINE WORKS, INC., OF NEW YORK, N. Y., A CORPORATION OF DELAWARE

ACID WOOL DYESTUFFS OF THE ANTHRAQUINONE SERIES

No Drawing. Application filed May 7, 1928, Serial No. 275,964, and in Germany May 18, 1927.

The present invention relates to the manufacture of acid wool dyestuffs of the anthraquinone series, more particularly it relates to a process of preparing 1-amino-anthraquinone-2-sulfonic acids being substituted in the 4-position by an amino residue of a cyclic paraffin.

I have found that by reacting at elevated temperature with a neutral alkali metal salt of sulfurous acid, preferably with sodium or potassium sulfite, upon a compound of the general formula:

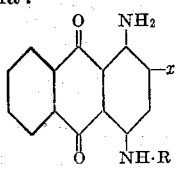

wherein $x$ stands for halogen, $-$NH·R means the amino residue of a cyclic paraffin as, for instance, cyclo-hexylamine, bornylamine, pentamethylenamine, etc. the halogenatom in the 2-position can easily be replaced by a sulfogroup. The reaction is performed in the presence of a suitable solvent preferably of a solvent which is capable of dissolving the starting material as well as the alkali metal sulfite. Such solvents are, for instance, mixtures of alcohol and water, pyridine and water, etc. It is possible to apply these solvents in an amount not sufficient to dissolve all of the anthraquinone compound and of the sulfite being present. The temperature at which reaction takes place varies within wide limits but will range in the most cases between about 110–150° C. According to the solvent used it will often be necessary to perform the reaction in an autoclave at superatmospheric pressure, but it is to be understood, that the latter is only used in order to allow the heating of the reaction mixture to a suitable temperature.

The products thus obtainable are valuable blue wool and cellulose acetate dyestuffs.

The following example illustrates my invention without limiting it thereto:

*Example.*—5 parts by weight of 1-amino-2-bromo-4-hexahydro-phenylamino-anthraquinone, 5 parts by weight of sodium sulfite, 50 parts by weight of alcohol and 50 parts by weight of water are heated in an autoclave to about 120° C. until the 1-amino-2-bromo-4-hexahydro-phenylamino-anthraquinone has completely dissolved. The alcohol is then removed by steam distillation, and the 1-amino-4-hexahydro-phenylamino-anthraquinone-2-sulfonic acid produced is precipitated with sodium chloride.

I claim:

1. The process which comprises heating a compound of the general formula:

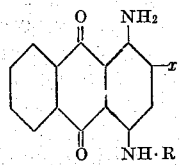

wherein $x$ stands for halogen, $-$NH·R means the amino-residue of a cyclic paraffin, with a neutral alkali metal salt of sulfurous acid in the presence of a solvent being capable of dissolving the starting material as well as the alkali metal sulfite.

2. The process which comprises reacting upon a compound of the general formula:

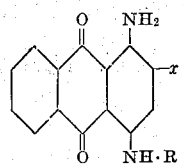

wherein $x$ stands for halogen, $-$NH·R means the amino-residue of a cyclic paraffin, with a neutral alkali metal salt of sulfurous acid in the presence of a solvent being capable of dissolving the starting material as well as the alkali metal sulfite, at a temperature of about 110–150° C.

3. The process which comprises reacting upon a compound of the general formula:

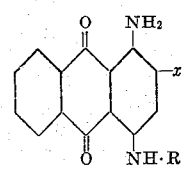

wherein $x$ stands for halogen, $-$NH·R means the amino-residue of a cyclic paraffin, with a neutral alkali metal salt of sulfurous acid in the presence of a solvent of the group consisting of mixtures of alcohol and water and mixtures of pyridine and water at a temperature of about 110–150° C. and at superatmospheric pressure.

4. The process which comprises reacting upon a compound of the general formula:

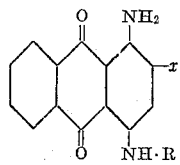

wherein $x$ stands for halogen, $-NH\cdot R$ means an amino residue of a six membered cyclic paraffin, with a neutral alkali metal salt of sulfurous acid in the presence of a solvent of the group consisting of mixtures of alcohol and water and mixtures of pyridine and water, at a temperature of about 110–150° C. and at superatmospheric pressure.

5. The process which comprises reacting upon 1-amino-2-bromo-4-hexahydro-phenyl-amino-anthraquinone with a neutral alkali metal salt of sulfurous acid in the presence of a solvent of the group consisting of mixtures of alcohol and water and mixtures of pyridine and water, at a temperature of about 110–150° C. and at superatmospheric pressure.

6. The process which comprises reacting upon 1-amino-2-bromo-4-hexahydro-phenyl-amino-anthraquinone with sodium sulfite in the presence of a mixture of equal parts by weight of alcohol and water at a temperature of about 120° C. at superatmospheric pressure and salting out the 1-amino-4-hexahydro-phenylamino-anthraquinone-2-sulfonic acid thus formed.

In testimony whereof I have hereunto set my hand.

KLAUS WEINAND.